United States Patent [19]
McIntyre et al.

[11] 3,938,764
[45] Feb. 17, 1976

[54] FRANGIBLE AIRCRAFT FLOOR

[75] Inventors: Robert G. McIntyre, Manhattan Beach; Otto J. Minnich, Orange, both of Calif.

[73] Assignee: McDonnell Douglas Corporation, Long Beach, Calif.

[22] Filed: May 19, 1975

[21] Appl. No.: 578,479

[52] U.S. Cl............ 244/117 R; 49/141; 137/68 R; 182/19; 244/118 P; 244/121; 244/129 R
[51] Int. Cl.²......................................... B64C 1/18
[58] Field of Search ............ 244/118 P, 118 R, 121, 244/122 AF, 119, 129 R, 117 R; 52/98, 1; 49/141 X, 21, 31; 98/1.5; 137/68 R, 68 A; 182/18, 19; 340/273, 274, 421

[56] References Cited
UNITED STATES PATENTS

| | | | |
|---|---|---|---|
| 1,951,897 | 3/1934 | Binckley | 137/69 R X |
| 2,679,467 | 5/1954 | Sherts | 244/121 X |
| 2,942,811 | 6/1960 | Bell | 244/118 P |
| 3,288,992 | 11/1966 | Matsudaira et al. | 137/68 R |
| 3,425,333 | 2/1969 | Wachter | 98/1.5 |
| 3,643,899 | 2/1972 | Firestone | 244/121 |
| 3,729,154 | 4/1973 | Deplante | 244/122 AF |
| 3,742,968 | 7/1973 | Kennedy | 137/68 R |
| 3,834,076 | 9/1974 | Vallee | 49/31 |

FOREIGN PATENTS OR APPLICATIONS

| | | | |
|---|---|---|---|
| 428,647 | 5/1935 | United Kingdom | 49/141 |
| 1,003,851 | 3/1957 | Germany | 137/68 R |

*Primary Examiner*—Trygve M. Blix
*Assistant Examiner*—Galen L. Barefoot
*Attorney, Agent, or Firm*—John P. Scholl; Walter J. Jason; Donald L. Royer

[57] ABSTRACT

The upper floor of a multi-deck pressurized aircraft having frangible floor panels sealing the floor during normal flight conditions yet rupturable under a predetermined environmental condition such as when a relatively high pressure differential exists between the upper cabin and lower cargo compartments. This may occur, for example, when the cargo compartment is depressurized by inflight explosion or collision. Differential pressure activates the panel destruction apparatus which strikes the frangible floor panels in such manner as to cause them to disintegrate or crumble into small pieces. Typical panels may be chemically strengthened glass, ceramics, etc.

9 Claims, 5 Drawing Figures

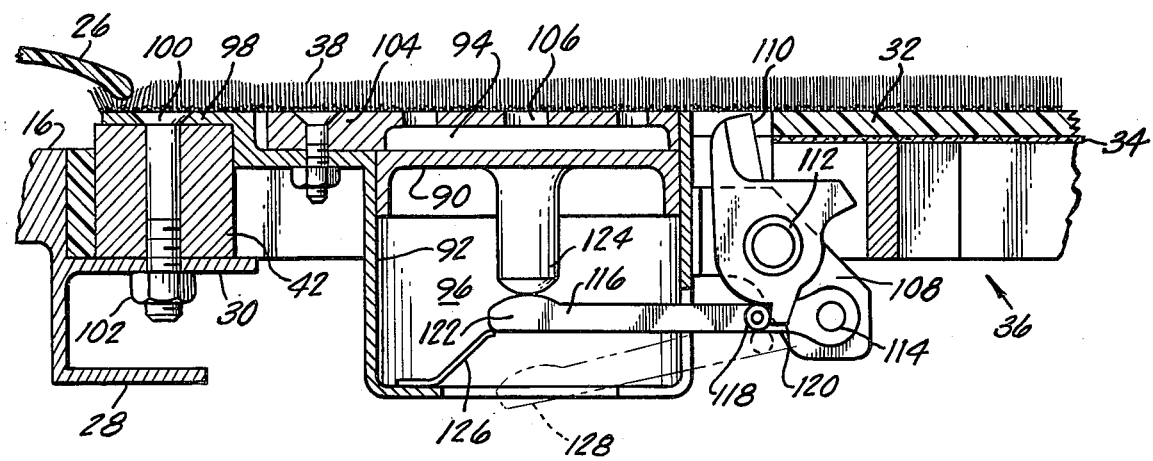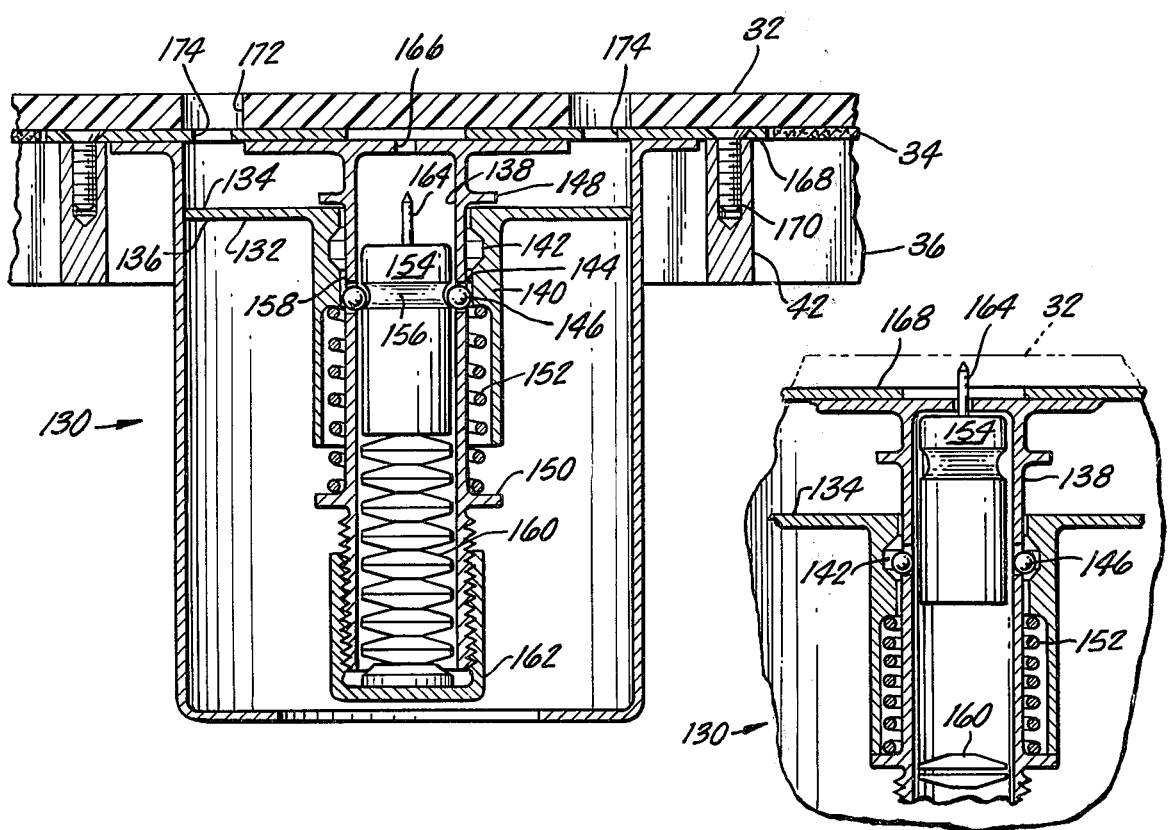

FRANGIBLE AIRCRAFT FLOOR

BACKGROUND OF THE PRESENT INVENTION

Wide-bodied commercial jet aircraft are subject to critical damage to the passenger compartment floor as a result of a large hole made (by any means such as inflight explosion or collision) in a lower cargo compartment while the airplane cabin and cargo compartments are at a high pressure differential with the outside atmospheric air pressure. Upon rapid decompression of the lower cargo compartment, severe down loads are placed on the passenger floor due to the air pressure above the floor. The air above the floor cannot escape rapidly into the cargo compartment as the passenger compartment floor is normally made as a sealed floor due to air conditioning requirements, appearance, keeping below-floor noise from entering the cabin, and keeping spilled liquids from entering the cargo compartment. Consequently, because of this pressure differential, structural damage to the floor and nearby components, controls and systems may occur, with even the safety of the aircraft placed in jeopardy.

In regulating the pressure differential between containers or compartments, the use of valves probably would occur to one skilled in the art. However, the use of valves to compensate for a sudden change in pressure between upper and lower compartments of an aircraft is impractical because of the limited valve area through which fluid must flow at a high rate for instantaneous pressure compensation. Moreover, the delay in valve opening is too great, requiring too much time to equalize the pressures.

SUMMARY OF THE PRESENT INVENTION

The frangible aircraft floor of this invention provides sufficient venting of the passenger compartment into the lower cargo compartment to relieve the differential pressure effect on the floor during an inflight decompression of the cargo compartment, yet maintain the floor sealed during normal flight conditions. This floor comprises a porous support in the form of a structural floor grid designed to take normal and crash floor shear loads, and in the emergency mode (decompression of the lower cargo compartment) to provide a porous barrier surface suitable for supporting passengers. A frangible panel is secured to the top surface of the structural grid by edge retainers. In one application, five panels per aircraft are used. Each panel is approximately ⅛ inch thick, 15 inches wide and 60 inches long. A resilient gasket between the grid and panel compensates for any unevenness of the parts. A floor covering material such as carpet is placed over the panel. This carpet may be porous enough so as not to interfere with the equalization of pressurization. In the alternative, the carpet may have sections cut to match the openings in the grid and fall through when the panel disintegrates.

A differential pressure actuating device, such as an aneroid controlled initiator, is supported by the structural grid for contact with the panel when actuated by a differential pressure across the floor between the passenger compartment and the cargo compartment underneath. A spring-loaded striker having a specially hardened carbide tipped point is held in cocked position by an aneroid controlled hold-back sear.

During normal flight conditions of the airplane the floor, including the frangible panels, is rugged and extremely resistant to abuse due to the high strength of the chemically strengthened ceramic sheets comprising the frangible panels. Any applied coating or carpeting also adds protection to the panels.

When an inflight emergency occurs, resulting in rapid decompression of the lower cargo compartment, the resultant pressure differential, on the order of from 0.5 to 1.5 psi, causes the floor panels to crumble and disintegrate, venting the floor and equalizing pressures above and below the floor. This shattering is caused when the aneroid contracts and releases the spring-loaded striker which is driven into the frangible panel. The momentum of the striker causes a point or edge thereon to penetrate the thin compression layer of the chemically strengthened ceramic panel and enter its tension layer. This immediately destroys the structural integrity of the panel and the locked-in stresses cause complete disintegration into rice grain sized crystals. The carpet pieces are now unsupported and are free to bend. The pressure above the floor pushes the carpet pieces through the grid and into the cargo compartment. Upon fragmentation of the ceramic panel, this frangible aircraft floor immediately becomes a very effective vent for equalizing the upper and lower pressures without damage to the floor structure. It obviously can be made to operate when reverse decompression occurs, such as when the passenger compartment becomes depressurized.

In addition to the obvious advantages of the present invention in fulfilling its intended function, there are other advantages including:

A. The chemically strengthened ceramic sheet panels are flush mounted and do not impair the seat spacing flexibility within the aircraft.

B. There is no interference with passenger foot room or carry-on baggage space.

C. No styling change or change in the appearance of the aircraft is required.

D. Floor sections may be built up as subassemblies and can be retrofitted easily during the overnight period between flights.

E. The floor vent area gained has a high effective area relative to the floor area affected for minimum delay in equalizing the upper and lower pressures.

F. Tooling costs are minimal and the unit cost is also low.

G. Reliability is high, maintenance is low since the floor has no moving parts except for the aneroid actuation device.

H. Quality assurance is automatic since the ceramic sheet panels will not survive their own processing if they are defective.

I. The ceramic sheet panels are not subject to corrosion or aging.

BRIEF DESCRIPTION OF THE DRAWINGS

FIG. 3 is an elevational view of another form of the floor sheet panel disintegrator; and FIGS. 4 and 5 are sectional views taken in elevation of still another form of sheet panel disintegrator.

DETAILED DESCRIPTION OF THE DRAWINGS

Figure 1:
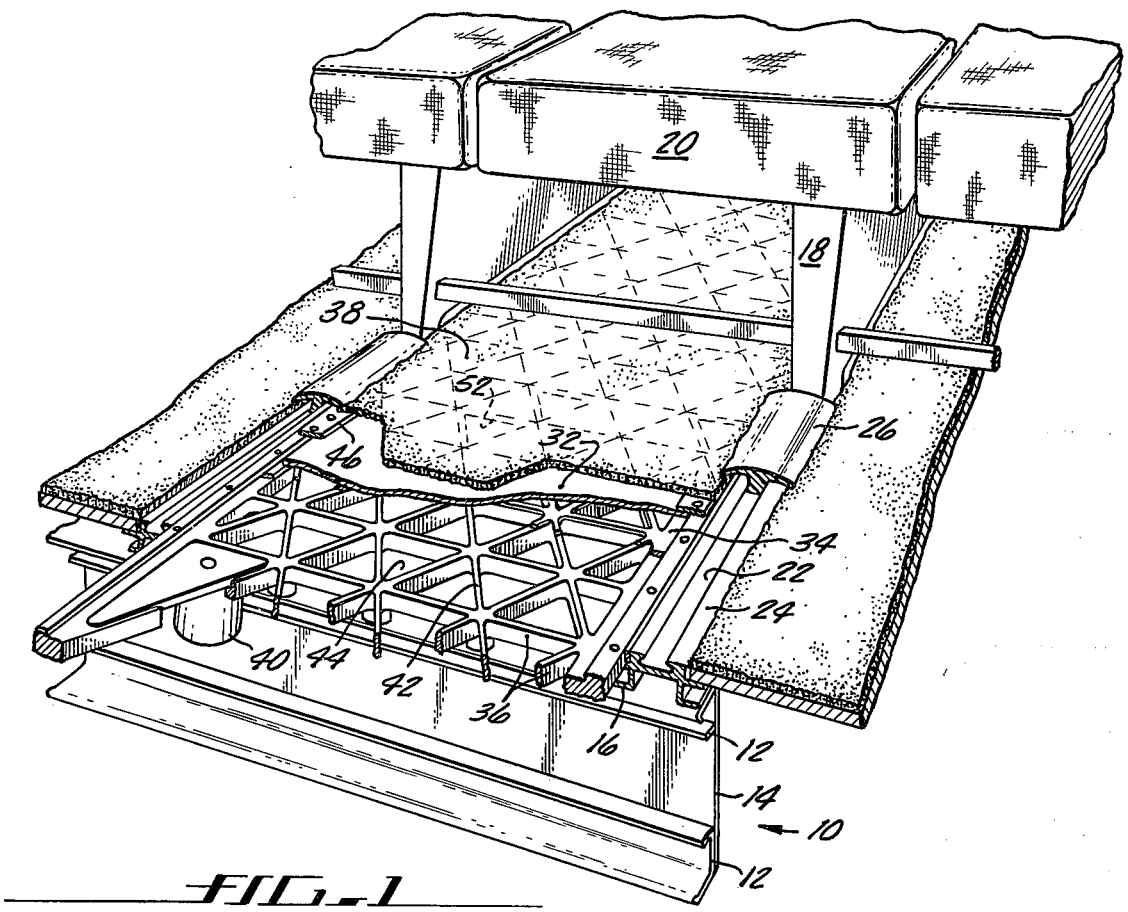
FIG. 1 is a fragmentary perspective view of the frangible aircraft floor with portions removed for clarity.

Reference is now made to FIG. 1 wherein there is shown a portion of aircraft flooring separating a lower cargo compartment and upper passenger compartment. This flooring includes transverse beams 10 consisting of channels 12 and webs 14 extending across an aircraft fuselage for floor structure support. Seat tracks 16 are spaced across these support beams 10 and extend longitudinally in the aircraft. These seat tracks have channels 22 in the top surface 24 of the track structure to receive legs 18 of passenger seats 20. Trim strips 26 fill the channels 22 between passenger legs 18 of seats fore and aft. The sides of the track structure are channel-shaped with lower feet 28 extending across, and supported by, the upper channel 12 of beam 10. The upper feet 30 extend outwardly from the sides and below the plane of surface 24 to serve as supports for floor paneling. Conventional floor paneling may be plywood or honeycomb panels normally bolted to legs 30. Any novelty in this structure per se thus described is disclaimed inasmuch as it is conventional and in use in most present day aircraft. However, the frangible floor panels 32, gasket material 34, isogrid support structure 36, floor covering 38, and aneroid actuator 40, to be described and in combination therewith, present the patentable features comprising the present invention.

Between the legs 30 of spaced seat tracks 16 is an isogrid support structure 36 comprising vertical intersecting webs 42 defining openings 44. This structure may be of any configuration that will support the panels 32 until they disintegrate, are porous enough not to hinder pressure equalization, and will support passengers after the panels 32 have crumbled. On top of the webs is a gasket material 34 over which is placed a frangible panel 32 which is held in place by retaining strips 46 extending over the edges thereof. Bolts 48 pass through strips 46, isogrid 36 and upper feet 30 and, with nut 50, holds the combination in place. Carpeting or floor covering 38 is laid over the frangible panel 32 with its edges terminating under trim strip 26. This carpeting 38 may be porous or cut in pieces to match the openings 44 in the grid 36. It also may be cut along lines 52 above the webs 42 so that they are free to bend when panel 32 disintegrates and the pressure above the floor pushes the carpet pieces through the grid and into the cargo compartment below. Upon fragmentation of the frangible panel 32 the floor becomes a very effective vent for equalizing the passenger and cargo compartment pressures.

The frangible panel 32 preferably is a thin (approximately ⅛ inch thick) chemically strengthened ceramic sheet of the type known as "Pyroceram" marketed by Corning Glass Works of Corning, N.Y. and used for ceramic stove tops. This is made by replacing lighter sodium ions with heavier potassium ions in a hardening bath, resulting in prestressed compression on the surface (up to about 0.010 inch thickness) and tension on the inner part. One example of how this is done is set forth in U.S. Pat. No. 2,779,136 issuing Jan. 29, 1957 to Harrison P. Hood and Stanley D. Stookey for Method of Making a Glass Article of High Mechanical Strength and Article Made Thereby, and assigned to Corning Glass Works. Such material normally had been used for anti-chipping purposes such as in coating surfaces of appliances. However, it has been discovered, in accordance with the present invention, that upon impact of a hightly concentrated load at any point with a force sufficient to penetrate the surface compression layer, the frangible panel will break instantaneously and completely into small pieces over the entire part. It is this characteristic that is utilized regardless of the material from which the panel is made or the process used in making it.

A hardened carbide tipped point or a high heat treated steel tip may be used to penetrate the surface compression layer of panel 32. Such a tip or point may be driven when the pressure differential between the upper passenger and lower cargo compartments exceeds a present amount, on the order of from 0.5 to 1.5 psi, for example. An aneroid actuator 40 is a device that drives such a point into the surface compression layer of panel 32 from the underside. It is mounted in the grid 36 and extends below the floor in FIG. 1.

Figure 2:
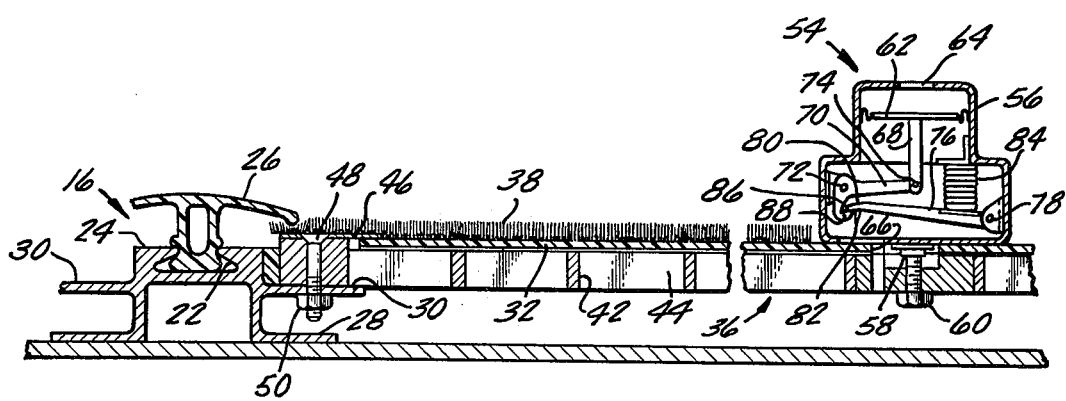
FIG. 2 is an elevational sectional view of the floor with the aneroid controlled initiator in a different location.

In FIG. 2 an actuator 54 is shown mounted on the top of panel 32. In this embodiment the housing 56 is fastened to the grid 36 by means of an anchor nut and bolt 58, 60. Within housing 56 is a pressure sensitive diaphragm 62 having its upper surface exposed to the upper passenger compartment pressure through opening 64 and the lower surface exposed to the lower cargo compartment pressure through opening 66. The diaphragm 62 moves in response to changes in pressure differences between the two pressures. A connecting stem 68 is attached to the diaphragm 62 and moves vertically as the diaphragm moves. A latching arm 70 is pivotally connected at one end 72 to the housing 56 and at its other end 74 to the lower end of connecting stem 68. A striker arm 76 is pivotally mounted at end 78 to housing 56. Its other end 80 has a hardened carbide tipped point 82 adapted to strike the frangible panel 32 upon downward movement of the striker arm 76 under the influence of compression spring 84. This spring is positioned between the top of housing 56 and striker arm 76 to urge this downward movement at all times. A keeper 86 extends forwardly on striker arm 76 to engage a catch member 88 on latching arm 70. This catch member 88 on latching arm 70 engages keeper 86 to maintain the striker arm 76 in cocked position and ready for actuation.

When pressure below diaphragm 62 is reduced so that the differential pressure is increased, the connecting stem 68 moves downwardly to rotate latching arm 70 clockwise, keeper 86 is freed from catch member 88. Spring 84 then drives tip 82 into the frangible panel 32, causing its disintegration.

FIG. 3 shows in elevational cross section another form of actuator for disintegrating the frangible floor panel. Here is shown a piston 90 vertically movable within a cylindrical wall 92 in response to changes in pressure above the piston at 94 and below it at 96. The cylindrical wall fits within the grid support structure 36 by attachment to one of the webs 42. As shown, a flanged extension 98 of cylinder wall 92 fits over web rib 42 and is fastened to upper foot 30 of track 16 by means of nut and bolt 100, 102. A protective cover 104 fits over the piston 90. This cover has apertures 106 to permit pressurization at 94 in accordance with that of the upper passenger compartment. Lower area 96 is in pressure communication with the lower cargo compartment. Should this pressure become reduced, piston 90 moves downwardly to actuate a tripping device to release the frangible panel disintegrator.

Mounted on the outside of cylinder wall 92 is a bracket 108 on which is pivotally mounted a blade 110.

A torsion rod 112 interconnects bracket 108 with blade 110 and provides the clockwise rotational force for driving blade 110 against the edge of panel 32, to cause its disintegration. Also pivotally mounted at 114 on the bracket 108 is a tripping lever 116 having a keeper 118 thereon. In the position shown, this keeper engages tab 120 to prevent rotation of blade 110. End 122 of lever 116 engages a projection 124 on piston 90 and is maintained in contact with it by spring 126. When piston 90 moves down, lever 116 rotates about pivot 114 to the position shown in phantom lines 128. This moves keeper 118 away from tab 120, permitting torsion rod 112 to drive blade 110 into panel 32, causing its disintegration.

FIGS. 4 and 5 illustrate in section the construction and operation of another form of aneroid actuated panel disintegrator. This disintegrator comprises a differential pressure housing 130 containing a movable pressure response plate or piston 132 vertically movable in response to changes in pressure on its top surface 134 (corresponding to passenger compartment pressure) and changes in pressure on its bottom surface 136 (corresponding to cargo compartment pressure). This plate 132 surrounds a centrally positioned plunger housing 138 and has guide walls 140 slidably mounted thereover. These guide walls have recesses 142 on their inner surfaces 144 to receive locking members 146 upon downward movement of plate 132, as shown in FIG. 5. Plunger housing 138 has an upper stop collar 148 and a lower stop collar 150 to limit the vertical movement of pressure plate 132. A helical spring 152 between lower stop collar 150 and guide wall continually urges it up against stop collar 148.

Within plunger housing 138 is a plunger 154 having an annular recess 156 in its surface to receive locking members 146 which are laterally movable in openings 158 in plunger housing 138. Until such time as pressure plate 132 moves down and recess 142 is aligned to receive the locking members 146, these members 146 remain in recess 156, as shown in FIG. 4, to retain plunger 154 in the cocked and ready position as shown.

Within plunger housing 138 and below plunger 154 is a stack of disc or Belleville springs 160. These springs are under compression between a cap 162 threadedly fastened over the lower end of plunger housing 138 and the lower end of plunger 154 when the plunger is cocked as shown in FIG. 4. Cap 162 may be used to adjust the compression as desired, simply by rotation to adjust the cap distance from the cocked plunger. A high load with small deflection is a desired characteristic of the compressive force used to drive the plunger upwardly.

On the top surface of plunger 154 is a hardened carbide tipped spike 164. This spike is adapted to pass through an opening 166 in the top of housing 138 and strike the bottom surface of frangible panel 32. This occurs, as shown in FIG. 5, when pressure plate 132 moves downwardly to align recesses 142 with locking members 146 to release plunger 154 for upward movement.

The positioning of the actuator must be such to insure that the spike will strike the panel upon actuation. As shown in FIG. 4, a cover plate 168 has both the differential pressure housing 130 and plunger housing 138 fastened to its undersurface, such as by welding. This cover plate is adapted to fit over webs 42 with the housing 130 suspended in between. The cover plate 168 may then be fastened to webs 42 such as by screws 170. Frangible panel 32 is then placed over the structural grid and held with retaining strips as previously set forth in describing the structure in FIG. 1. Openings 172 in the frangible panel 32 aligned with openings 174 in cover plate 168 provide the upper surface 134 of pressure plate 132 with passenger compartment pressure. Any applied coating or carpeting adds protection to the panel. Should the bonded covering become extensively soiled or worn, the entire ceramic panel may be removed from the aircraft and replaced with a spare panel to which has been bonded a new floor covering. The removed panel assembly may be easily cleaned of the old bonded carpet by a dip process as the ceramic panel is unaffected by most solvents.

Although the use of frangible panels have been described for use in aircraft floors, other uses may be had of its characteristics. For example, they may be used for retaining diaphragms or bulkheads to control flow or release of any gas, liquid or solid. They may be used in pressure relief valves, safety devices, metered flow, emergency jettisoning, to provide openings in normally non-accessible areas in emergencies such as for access to or deployment of safety and rescue equipment, fire fighting, etc. They may also be used to adjust for environmental conditions such as for use in walls of buildings where tornadoes are apt to occur.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:

1. A frangible aircraft floor comprising a porous floor support;
   a frangible panel on said support; and
   means responsive to a predetermined environmental condition for striking said panel to disintegrate it.

2. A frangible aircraft floor as in claim 1 wherein said porous support has openings defined by webs over which said panel is supported.

3. A frangible aircraft floor as in claim 1 wherein said frangible panel is chemically strengthened to have a thin compression layer at its surface and an inner tension layer.

4. A frangible aircraft floor as in claim 1 wherein said predetermined environmental condition is a pressure differential between two compartments.

5. A frangible aircraft floor as in claim 1 wherein said predetermined environmental condition is a reduction in pressure in the cargo compartment of said aircraft.

6. A frangible aircraft floor as in claim 1 wherein said means is a differential pressure activated panel destruction apparatus.

7. A frangible aircraft floor as in claim 6 wherein said apparatus includes a spring-loaded plunger releasable by an aneroid initiator in response to an increase in differential pressure.

8. A frangible aircraft floor as in claim 1 wherein said predetermined environmental condition is a pressure differential between the sides of said panel.

9. A method of equalizing pressure in an upper passenger compartment and a lower cargo compartment comprising the steps of placing a plurality of frangible floor panels on a porous support for said passenger compartment and striking the panels to disintegrate them when the differential pressure between the two compartments exceeds a predetermined amount.

* * * * *